United States Patent

Wang

Patent Number: 5,615,512
Date of Patent: Apr. 1, 1997

[54] FLOAT WITH LIGHT INDICATORS

[76] Inventor: Yi-Chang Wang, No. 43, Chung Cheng Rd., Lin Kou Tsun, Lin Kou Hsiang, Taipei Hsien, Taiwan

[21] Appl. No.: 574,285

[22] Filed: Dec. 18, 1995

[51] Int. Cl.⁶ .......................... A01K 85/01; A01K 93/00
[52] U.S. Cl. ................................. 43/17.5; 43/17
[58] Field of Search ........................ 43/17, 17.5

[56] References Cited

U.S. PATENT DOCUMENTS

| | | | |
|---|---|---|---|
| 4,658,532 | 4/1987 | McFarland | 43/17.5 |
| 4,748,761 | 6/1988 | Machovina | 43/17.5 |
| 4,827,655 | 5/1989 | Reed | 43/17.5 |
| 4,884,355 | 12/1989 | Neilioff | 43/17.5 |
| 5,036,615 | 8/1991 | Lu | 43/17.5 |
| 5,052,145 | 10/1991 | Wang | 43/17.5 |
| 5,119,578 | 6/1992 | Johnson | 43/17.5 |
| 5,199,205 | 4/1993 | Klammer | 43/17.5 |
| 5,274,945 | 1/1994 | Ross | 43/17.5 |
| 5,351,431 | 10/1994 | Ryu | 43/17.5 |
| 5,351,432 | 10/1994 | Tse | 43/17.5 |

FOREIGN PATENT DOCUMENTS 2464645  4/1981  France ................................. 43/17.5

Primary Examiner—Kurt Rowan
Attorney, Agent, or Firm—Morton J. Rosenberg; David I. Klein

[57] ABSTRACT

Disclosed is a float with light indicators. The float is provided therein with a green and a red lights, batteries, a contact switch, and loadstone holder connected at a lower end to a fishhook holder that downward extends out of the float to connect a fishhook. When the float is stably floating on a water surface, the fishhook holder and the loadstone holder are in a higher position in the float to cause the contact switch to lighten the green light indicator, and when a fish bites the fishhook and thereby causes the fishhook holder and the loadstone holder to move downward, the contact switch is caused to lighten the red light indicator. An angler may easily determine whether a fish is hooked from the lightened red indicator and timely pulls the fishing rod.

1 Claim, 4 Drawing Sheets

FLOAT WITH LIGHT INDICATORS

BACKGROUND OF THE INVENTION

Most experienced anglers can "feel" that a fish is caught on the hook because the fishline and the fishing rod is pulled downward when a fish is biting the bait. This can be easily felt when fishing on a calm water. However, when the water is not so calm, and particularly when the angler is not an experienced one, it is difficult to "feel" whether a fish is hooked. Either an experienced angler or a starter needs to steadily watch the float when the same is thrown into the water and floating on the water surface. When the float sinks, it usually indicates a fish is biting and the angler is reminded to pull the rod as quickly as possible and hopefully to catch a fish. In the event the angler can not determine whether a sinking float indicates a bait-biting fish and does not timely pull the rod, he might very possibly lose the chance to angle the fish.

A conventional float is designed to use simply as a float. There is not anything in the float except gas. The conventional float does not have any other additional function. A starter or an unexperienced angler often fails to catch any fish even though he or she has never moved his or her sight away from the float on the water surface. That is, the sinking or floating of the float is not an effective and quick means for the anglers to determine whether a fish is biting.

It is therefore tried by the inventor to develop a new float which is more convenient and effective in helping an angler to determine whether a fish is biting.

SUMMARY OF THE INVENTION

A primary object of the present invention is to provide a float with light indicators. When the float of the present invention is floating on a water surface steadily, a green light is on. When the float sinks because a hook connected thereto is pulled down by a biting fish, the green light is off and a red light is on. Whenever the red light is on, the angler is reminded to pull the rod immediately. With the float of the present invention, an angler need not pay special attention to the movement of the float but notices the red light.

A second object of the present invention is to provide a float with light indicators in which batteries, a contact switch, and a loadstone holder are provided to lighten the light indicators. A fishhook is connected to a lower end of the loadstone holder. When the fishhook is pulled downward, the loadstone holder is also pulled downward to cause a magnetic ball in the contact swtich to move downward and thereby lightens a red indicator of the float. When the fishhook is free of any load, the loadstone holder is also in a higher position to cause the magnetic ball to move upward and thereby lightens a green indicator.

BRIEF DESCRIPTION OF THE DRAWINGS

The above and other objects of the present invention as well as the technical means and special structure to achieve these objects can be best understood through the following detailed description of the preferred embodiment and the accompanying drawings, wherein.

DETAILED DESCRIPTION OF THE PREFERRED EMBODIMENT

The present invention relates to a float with light indicators and includes a float body 1 in which a battery holder 2, a contact switch 3, and a loadstone holder 4 are provided.

Figure 1:
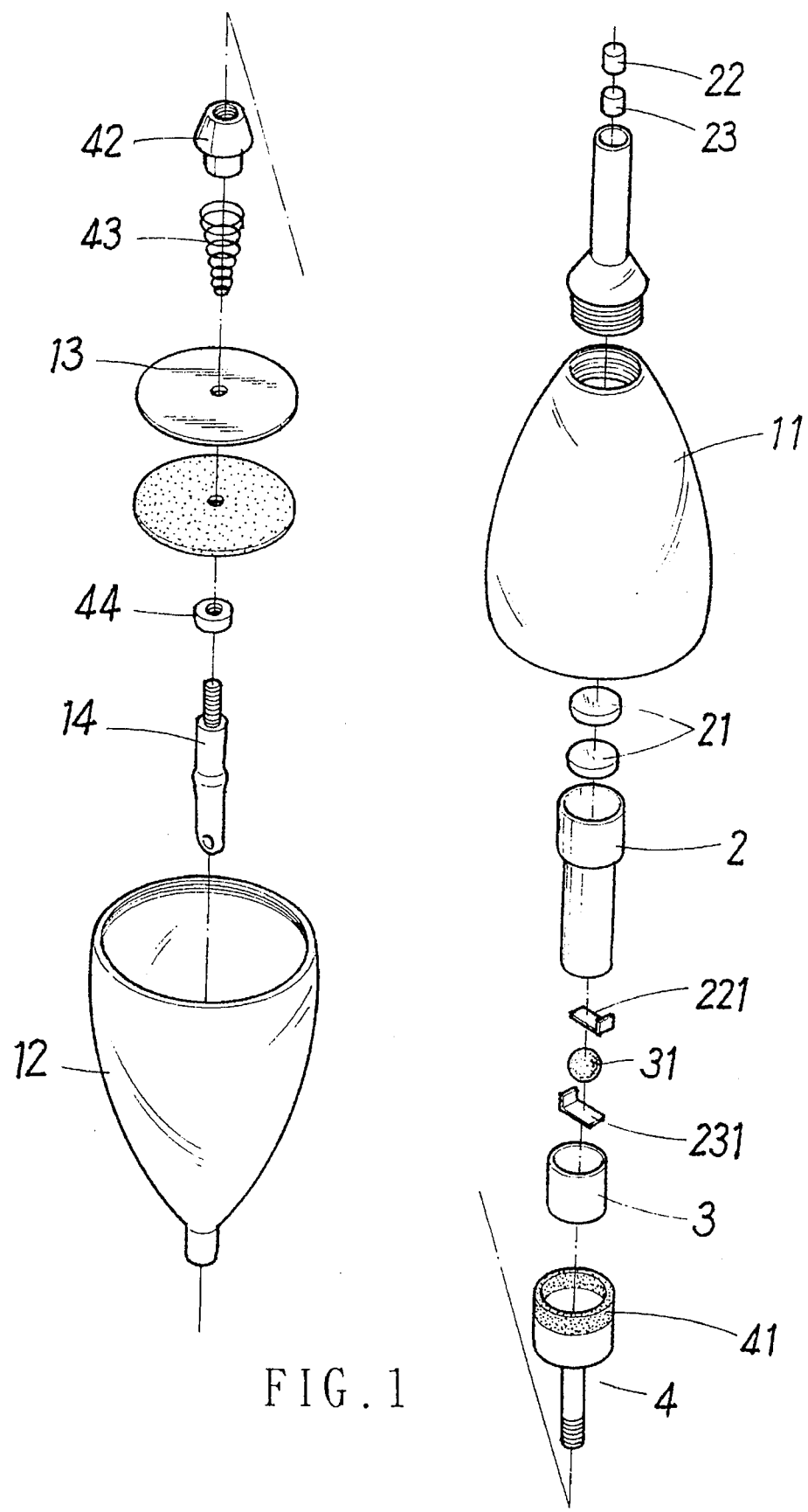
FIG. 1 is an exploded perspective of a float according to the present invention.
Figure 2:
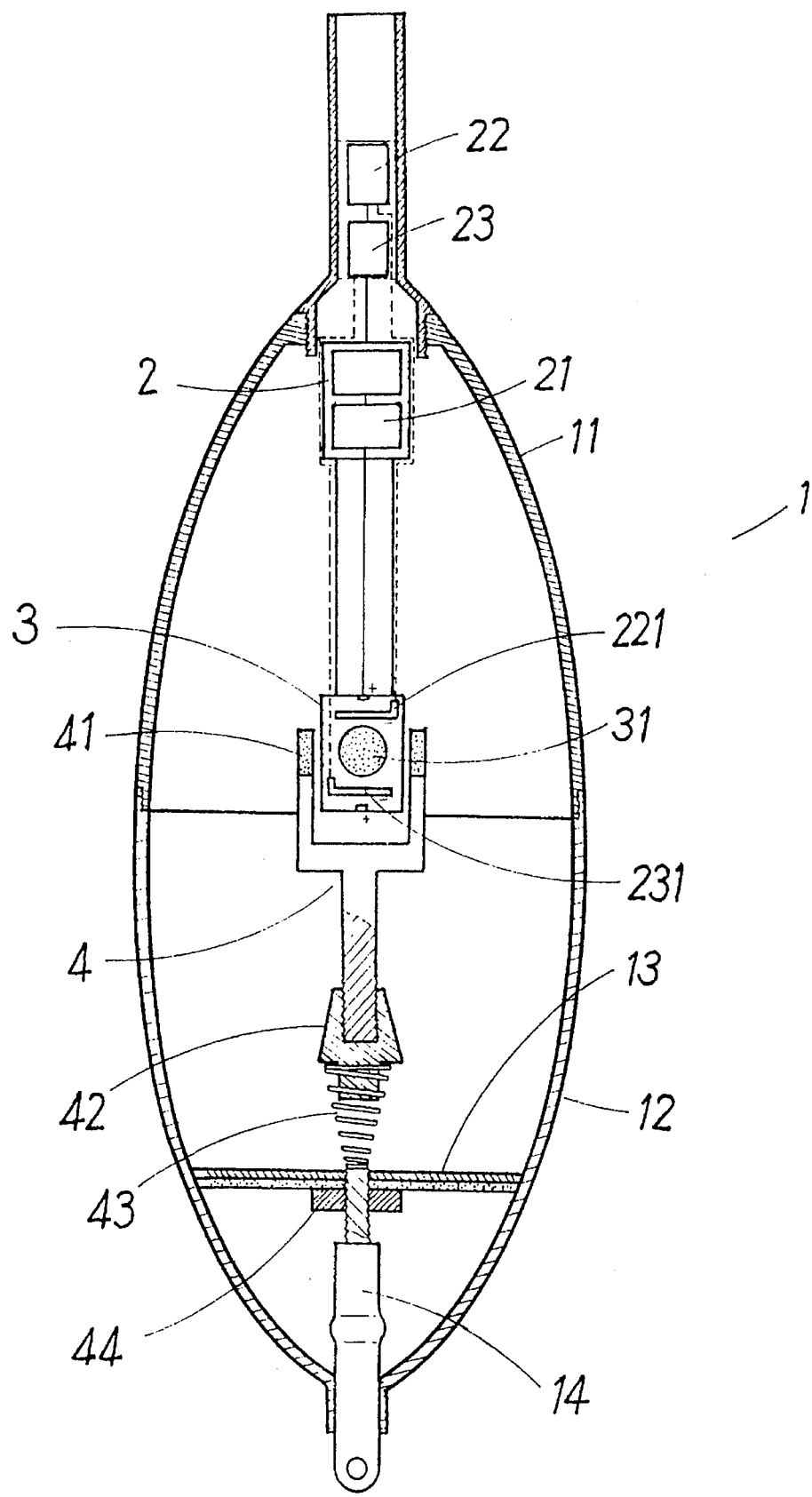
FIG. 2 is an assembled sectional view of a float shown in FIG. 1.

Please first refer to FIGS. 1 and 2. The float body 1 has a shape usually adopted in a conventional float and is assembled from an upper part 11 and a lower part 12 to define a hollow space thereinside. The upper part 11 has an upward extended and projected cap member detachably screwed to a top opening of the upper part 11 for accommodating two light indicators therein. A stopper 13 having a central through hole is provided inside the lower part 12. A fishhook holder 14 extends a reduced upper section thereof through the central hole of the stopper 13 and a thicker lower section thereof through and beyond a lower opening of the lower part 12 for a fishhook (not shown) to connect thereto via a fishline (not shown).

The battery holder 2 is fixed near to the top opening of the upper part 11 for holding batteries 21 therein. A green light 22 and a red light 23 are sequentially disposed over the batteries 21, that is, the green light 22 is positioned above the red light 23. The battery holder 2 has a lower extension to electrically connect with the contact switch 3 below it. Positive electrodes of the respective green and red lights connect to an upper and a lower end of the contact switch 3, respectively, via the batteries. A negative electrode of the green light 22 is connected to an L-shaped upper contact plate 221 which is suspended in the contact switch 3 at a higher position. A negative electrode of the red light 23 is connected to another L-shaped lower contact plate 231 which is also suspended in the contact switch 3 but at a lower position. A magnetic ball 31 is disposed in the contact switch 3 between the upper and the lower L-shaped contact plates 221, 231 such that the magnetic ball 31 is allowed to move upward or downward under an effect from an external magnetic force.

The loadstone holder 4 has an upper portion having an annular cross section and a lower rod portion. The upper annular portion is provided at a top rim with a loadstone ring 41 and is adapted to accommodate the contact switch 3 therein. An interconnecting member 42 is screwed to a lower end of the lower rod portion of the loadstone holder 4. A coil spring 43 is connected at an end to the interconnecting member 42 and at another end to the reduced upper section of the fishhook holder 14. An adjusting nut 44 is screwed around the reduced upper section of the fishhook holder 14 and is located below the stopper 13 for adjusting the distance between the interconnecting member 42 and the fishhook holder 14.

Figure 3:
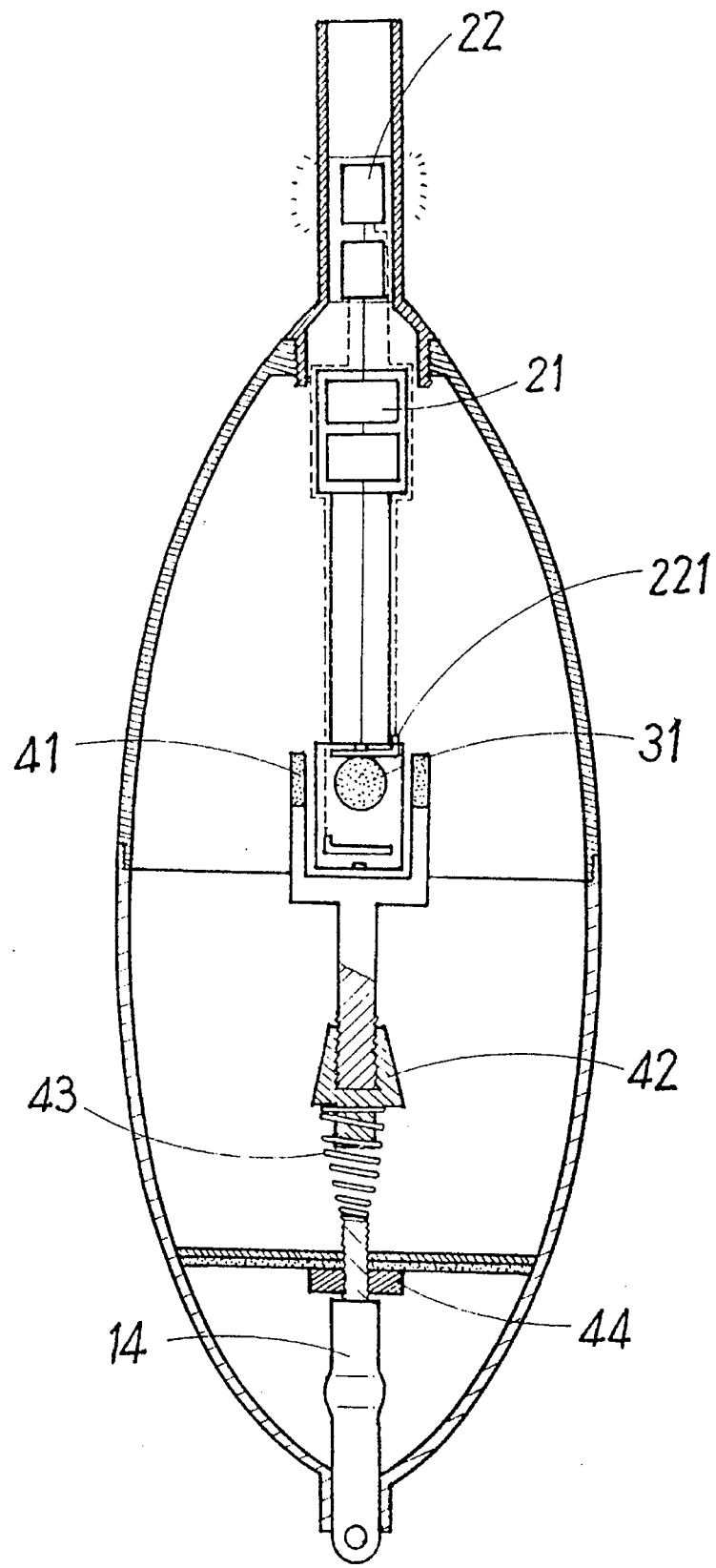
FIG. 3 is a sectional view of the float of the present invention in a floating position with a green indicator lighteded.
Figure 4:
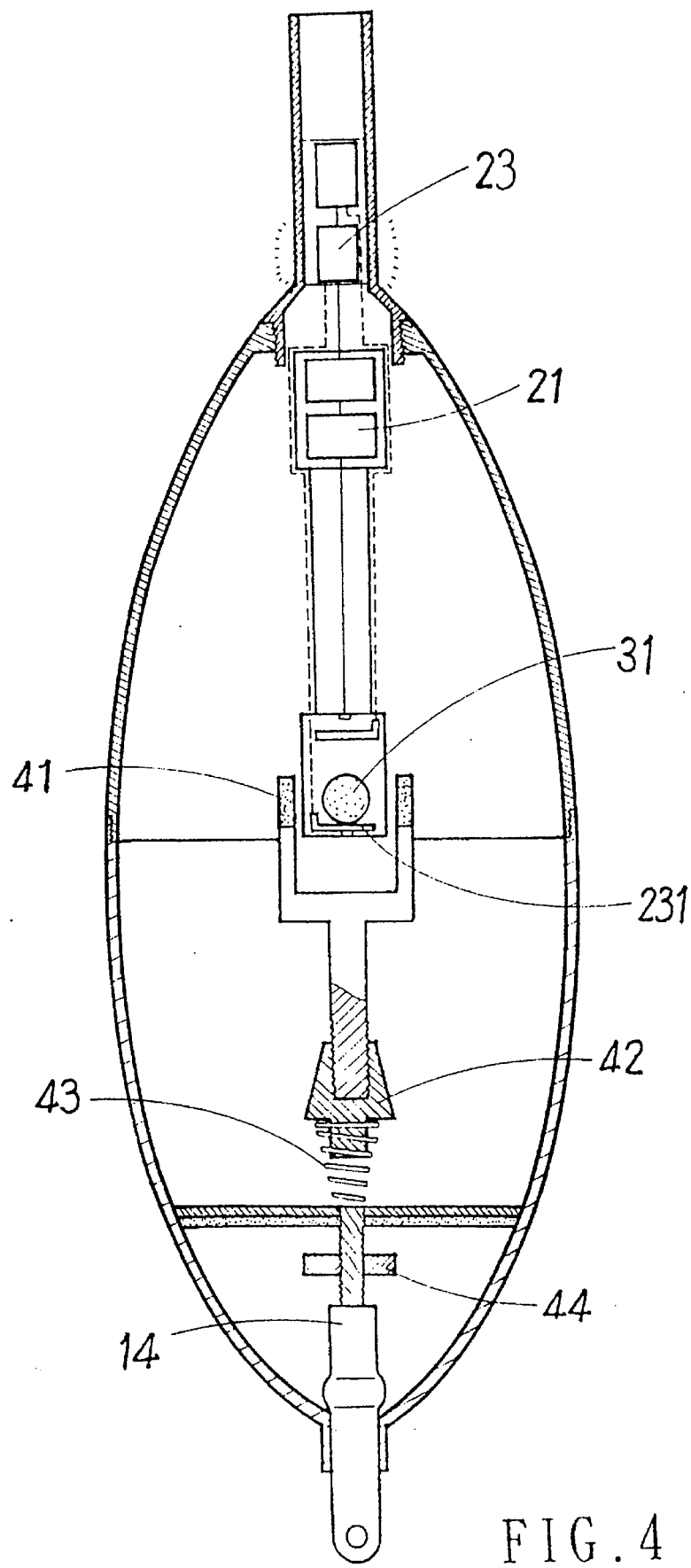
FIG. 4 is a sectional view of the float of the present invention in a sunk position with a red indicator lightened.

Please now refer to FIGS. 3 and 4 for the movement of the magnetic ball 31 in the contact switch 3 between the upper and the lower L-shaped contact plates 221, 231. When the float 1 of the present invention is thrown onto a water surface, it is in a freely floating position due to the buoyancy of water. At this point, the fishhook holder 14 is also floating due to the same buoyancy of water and is therefore in a higher position relative to the float body 1, as shown in FIG. 3. The floating fishhook holder 14 pushes the interconnecting member 42 via the coil spring 43 so that the member 42 moves upward to cause the loadstone holder 4 to ascend. When the loadstone holder 4 ascends, the magnetic ball 31 in the contact switch 3 also moves upward under an effect of the magnetic force of the loadstone ring 41 being pushed to a higher position. The upward moved magnetic ball 31 finally touches the upper L-shaped contact plate 221, causing the positive and the negative electrodes of the green light 22 above the contact switch 3 to electrically connect with each other and thereby lightens the green light 22. That is, when the green light 22 is on, it indicates the float 1 is stably floating on the water surface without any fish biting and pulling the fishhook under water. On the other hand, when there is any fish biting a bait on the fishhook, the fishhook and accordingly the fishhook holder 14 would be pulled downward. The downward movement of the fishhook holder 14 in turn causes the coil spring 43 to extend and pulls the interconnecting member 42 and accordingly the loadstone holder 4 to move downward, too. The downward moved loadstone holder 4 attracts the magnetic ball 31 in the contact switch 3 to descend until it touches the lower L-shaped contact plate 231 which causes the positive and the negative electrodes of the red light 23 to electrically connect with each other and thereby lightens the red light 23. That is, when the red light 23 is on, it indicates there is very possibly a hooked fish and the angler should immediately pull the fishing rod. When the fishhook is cleaned and ready for the next use and the float 1 is placed onto the water surface again, the bouyancy of water again causes the loadstone holder 4 to move upward and thereby the magnetic ball 31 touches the upper L-shaped contact plate 221 to lighten the green light 22, indicating the float 1 is in a stable floating condition.

The coil spring 43 is mainly used to control the sensitivity of the float 1. The coil spring 43 is disposed between the interconnecting member 42 and the fishhook holder 14 and, the distance between the top end of the fishhook holder 14 and the lower end of the interconnecting member 42 is adjustable by rotating the adjusting nut 44. That is, the distance between the interconnecting member 42 and the fishhook holder 14 can be named as a "sensitivity distance" which has direct influence on the force applied to the coil spring 43. The shorter the sensitivity distance is, the sooner a sinking fishhook will cause the red indicator 23 to lighten. On the contrary, the longer the sensitivity distance is, the slower the sinking fishhook will cause the red indicator 23 to lighten. So, the float 1 of the present invention can actually and effectively help the angler to timely pull the fishing rod.

What is claimed is:

1. A float with light indicators comprising a float body in which a green light indicator, a red light indicator, a battery holder, a contact switch, and a loadstone holder are provided; said battery holder holding two batteries therein and being connected at a top end to said red and said green light indicators and at a lower end to said contact switch; said float being characterized in that said contact switch has an upper L-shaped contact plate and a lower L-shaped contact plate disposed near an upper and a lower end of the contact switch, respectively, and a magnetic ball disposed between said upper and said lower L-shaped contact plates, and that said loadstone holder is distantly connected at a lower end to a fishhook holder via a coil spring; whereby when said float is floating stably on a water surface, said fishhook and accordingly said loadstone holder are in a higher position in said float body due to a buoyancy of water and causes said magnetic ball in said contact switch to ascend and touch said upper L-shaped contact plate to electrically connect a positive and a negative electrodes of said green light indicator, causing said green light indicator to lighten; and when said float sinks because said fishhook holder and said loadstone are pulled downward by a biting fish, said magnetic ball is caused to descend in said contact switch to touch said lower L-shaped contact plate and thereby electrically connect a positive and a negative electrodes of said red light indicator, causing said red light indicator to lighten.

* * * * *